United States Patent [19]
Fost et al.

[11] Patent Number: 6,100,358
[45] Date of Patent: Aug. 8, 2000

[54] ORGANOSILICONE HAVING A CARBOXYL FUNCTIONAL GROUP THEREON

[75] Inventors: Dennis L. Fost, Ridgewood; Abe Berger, Summit, both of N.J.

[73] Assignee: Mona Industries, Paterson, N.J.

[21] Appl. No.: 09/158,869

[22] Filed: Sep. 23, 1998

Related U.S. Application Data

[63] Continuation-in-part of application No. 08/651,730, May 22, 1996, Pat. No. 5,817,730.

[51] Int. Cl.$^7$ ................................................ C08G 77/04
[52] U.S. Cl. ................................ 528/26; 528/25; 528/38; 548/406
[58] Field of Search ............................. 528/26, 25, 38; 548/406

[56] References Cited

U.S. PATENT DOCUMENTS

| | | | |
|---|---|---|---|
| 5,807,955 | 9/1998 | Berger et al. | 528/26 |
| 5,817,730 | 10/1998 | Berger et al. | 528/26 |

*Primary Examiner*—Robert Dawson
*Assistant Examiner*—Jeffrey B. Robertson
*Attorney, Agent, or Firm*—Franklyn Schoenberg; Norman E. Lehrer

[57] ABSTRACT

A polysiloxane composition including an amphoteric class of organosilicone composition is provided having the formula:

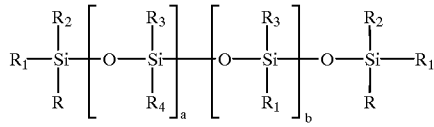

wherein:

$R$ is selected from $R_2$ or $-OR_9$, wherein $R_9$ is hydrogen or alkyl;

$R_1$, which can be the same or different, is selected from $R_2$, a diamine containing group of the formula $-F_1-NR_9-F-NH_2$, and at least one pyrrolidone-containing functional carboxyl group of the general formula:

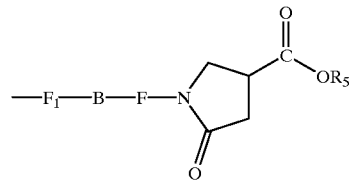

wherein $R_5$ is hydrogen, lower alkyl ($C_{1-6}$) or alkali metal; $F_1$ is linear or branched alkylene; $F$ is linear or branched alkylene; $B$ is $-NR_7$, wherein $R_7$ is hydrogen or a dicarboxylic group;

$R_2$ is selected from alkyl, aryl or olefinic;

$R_3$ and $R_4$, which may be the same or different are selected from alkyl, aryl, capped or uncapped polyoxyalkylene, alkaryl, aralkylene or alkenyl;

a is an integer from 0 to 50,000; and b is an integer from 0 to 100;

18 Claims, No Drawings

ORGANOSILICONE HAVING A CARBOXYL FUNCTIONAL GROUP THEREON

RELATED APPLICATION

This application is a continuation in part of application Ser. No. 651,730, filed May 22, 1996, U.S. Pat. No. 5,817,730.

FIELD OF THE INVENTION

The present invention relates to novel organosilicone compositions and, more particularly, to silicone compositions having a carboxyl functional group thereon.

BACKGROUND OF THE INVENTION

While some carboxyl functional organosilicones are known, they are generally difficult and expensive to prepare and the commercial use thereof has therefore been limited. Heretofore, no convenient method for preparing polysiloxanes containing functional carboxylic acid groups is known and indirect routes for their preparation have generally been used, such as hydrosilylation of an unsaturated ester followed by hydrolysis, or alternatively, by hydrolysis of nitrile-containing silicone fluids. However, polysiloxanes, both capped and uncapped, containing one or more functional groups such as amino and diamino functional groups are well known and have been used in a variety of commercial applications, but few of such polysiloxanes also contain carbofunctional carboxyl groups or provide an amphoteric class of organosilicones. Accordingly, the development of a method for readily preparing both capped and uncapped polysiloxanes containing one or more carbofunctional carboxyl groups would be desirable and it would be particularly advantageous if such method employed readily available silicone materials such as amino or diamino functional polysiloxanes for preparing not only a variety of capped polysiloxanes containing carbofunctional carboxyl groups including an amphoteric class of such organosiloxanes but uncapped siloxanes containing carbofunctional carboxyl groups as well including amphoteric derivatives thereof as well.

While, as indicated, certain capped or uncapped polysiloxanes containing carbofunctional carboxylic acid groups and methods for preparing the same have heretofore been suggested, there is no disclosure or suggestion of the novel capped carboxyl functional silicone compositions or the method of preparing the same described in copending application Ser. No. 651,730, U.S. Pat. No. 5,817,730 of which the present application is a continuation in part or of the novel capped or uncapped siloxanes containing carbofunctional groups of the present invention including derivatives of such compositions.

SUMMARY OF THE INVENTION

It is accordingly an object of the present invention to provide novel capped and uncapped organosilicone compositions having at least one pyrrolidone-containing carboxyl functional group thereon.

It is another object of the present invention to provide a novel amphoteric class of capped and uncapped organosilicone compositions.

It is a further object of the present invention to provide a method for readily preparing organosilicone compositions having at least one pyrrolidone-containing carboxyl functional group thereon and particularly an amphoteric class of organosilicone compositions.

It is still a further object of the present invention to provide cosmetic and personal care preparations which include novel carboxyl functional polysiloxane compositions, including an amphoteric class of polysiloxane compositions.

In accordance with the present invention, there has now been discovered novel polysiloxanes containing one or more carboxylic acid groups and/or the ester derivatives thereof that may be represented by the following general formula:

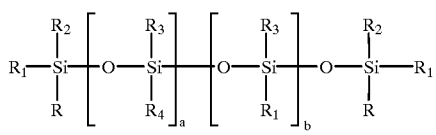

wherein:

R is selected from $R_2$ or $-OR_9$ wherein $R_9$ is hydrogen or alkyl $R_1$, which can be the same or different, can be selected from $R_2$, a diamine containing group of the formula $-F_1-NR_9-F-NH_2$, and a pyrrolidone containing carboxyl functional group of the formula:

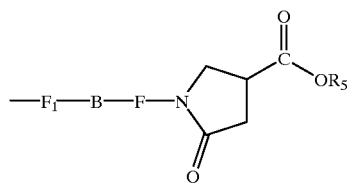

wherein at least one of $R_1$ is a pyrrolidone containing carboxyl or ester functional group or salt derivative thereof as shown; $F_1$ is linear or branched alkylene of 1–12 carbon atoms, preferably propylene and isobutylene; F is linear or branched alkylene of 1–10 carbon atoms, preferably ethylene; $R_2$ is as defined below; $R_5$ can be hydrogen, lower alkyl ($C_{1-6}$) or alkali metal; and B is $-NR_7$, wherein $R_7$ is hydrogen or a dicarboxylic group of the forumla $-CH_2-CH(COOR_9)-CH_2COOR_9$ wherein $R_9$ is hydrogen or an alkyl, with the provisio that at least 25% of $R_7$ is the above dicarboxylic group $R_2$ can be the same or different and can be selected from alkyl, aryl and olefinic (vinyl);

$R_3$ and $R_4$, which may be the same or different, are selected from alkyl, aryl, capped or uncapped polyoxyalkylene, alkaryl, aralkylene and alkenyl (vinyl);

a can be an integer from 0 to 50,000; and b can be an integer from 0 to 100.

In another aspect of the present invention there is provided a method for preparing capped or uncapped polysiloxanes containing one or more pyrrolidone-containing functional carboxylic acid groups and/or the ester derivatives thereof, and particularly an amphoteric class of polysiloxane compositions, which comprises reacting a capped or uncapped organosilicone fluid or composition having at least one diamine functional group which must contain at least one primary amine group with itaconic acid or an ester derivative thereof at an elevated temperature (preferably from about 90° C. to about 130° C.) for a time sufficient to react, preferably substantially completely react (generally ranging from about 1–5 hours), the itaconic acid or ester thereof with the functional primary and secondary amine group(s) on the silicone fluid or composition to form an organosilicone composition having at least one pyrrolidone-containing carboxyl functional group and substituted aminomethyl succinic acid and/or ester derivative.

In a further aspect of the present invention there is provided cosmetic and personal care preparations which contain from 0.1% to 10% of novel polysiloxanes containing one or more pyrrolidone-containing functional carboxyl groups and/or the ester or amidoamine derivatives thereof.

DESCRIPTION OF THE PREFERRED EMBODIMENTS

In accordance with the present invention there are provided novel polysiloxanes comprising a class of carboxyl functional polysiloxanes including an amphoteric class of such polysiloxanes which may be represented by the general formula:

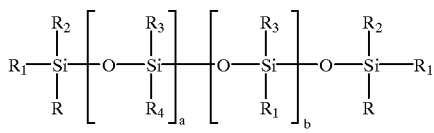

wherein:
R is selected from $R_2$ or $-OR_8$ wherein $R_8$ is hydrogen or alkyl, preferably lower alkyl;
$R_1$, which can be the same or different, can be selected from $R_2$, a diamine group of the formula $-F_1-NR_9-F-NH_2$ and a pyrrolidone containing carboxyl functional group of the general formula:

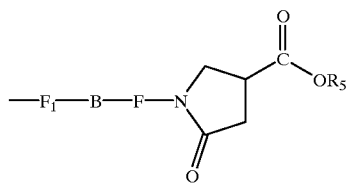

wherein at least one $R_1$ is a pyrrolidone-containing carboxyl or ester functional group or salt derivative thereof as shown; $F_1$ is linear or branched alkylene of 1–12 carbon atoms, preferably propylene and isobutylene; F is linear or branched alkylene of 1–10 carbon atoms, preferably ethylene; $R_2$ is as defined below; $R_5$ is hydrogen, alkyl, preferably lower alkyl $(C_{1-6})$, or an alkali metal; and B is $-NR_7$, wherein $R_7$ is hydrogen or a dicarboxylic group of the forumla $-CH_2-CH(COOR_9)-CH_2COOR_9$ wherein $R_9$ is hydrogen or alkyl, preferably lower alkyl, with the provision that at least 25% of $R_7$, preferably at least 75%, is the dicarboxylic group;
$R_2$ can be the same or different and can be selected from alkyl, aryl and olefinic alkenyl or alkynyl.
$R_3$ and $R_4$, which may be the same or are selected from alkyl, aryl, capped or uncapped polyoxyalkylene, alkaryl, aralkylene, alkenyl or alkynyl;
a can be an integer from 0 to 50,000; and
b can be an integer from 0 to 100;

It is evident from the general formula above that the polysiloxane compositions of the present invention have one or more pyrrolidone-containing functional carboxyl or ester group(s) or salt derivative thereof together with substituted aminomethyl succinic acid or ester derivative linked terminally, laterally or both terminally and laterally to the silicone (polysiloxane) chain through a hydrocarbon linkage which contains at least two nitrogen atoms.

The polysiloxane compositions including the amphoteric class of capped or uncapped polysiloxanes according to the present invention are useful, for example, for reducing the friction of petroleum flow through pipelines and as additives for personal care products as well as being precursors for a wide range of personal care products, fiber treating agents and the like which impart such advantages as improved feel, substantivity, reduced surface tension, and anti-stick characteristics.

The novel capped or uncapped functional carboxyl polysiloxanes and particularly the amphoteric class of polysiloxanes of the present invention surprisingly and unexpectedly can be readily and directly prepared by the reaction of corresponding capped or uncapped silicone compositions or fluids having one or more functional diamine groups, each of which group(s) must contain a primary amine group, with about stoichiometric quantities (2 equivalents) of itaconic acid or its ester per functional diamine group(s) at an elevated temperature for the time sufficient for substantially all of the itaconic acid or its ester to react with the functional primary and secondary amine group(s). In general from about 1.25, preferably, from about 1.9 to about 2.1 equivalents of itaconic acid or its ester per functional amine groups is reacted with the silicone fluid wherein substantially all the itaconic acid and preferably all the functional amine group(s) are reacted and a polysiloxane composition with at least one pyrrolidone-containing functional carboxyl group(s) and/or its ester or salt together with a substituted aminomethyl succinic acid or ester derivative is formed.

The reaction can be carried out neat or in an inert solvent such as alcohol, hydrocarbon solvent, chlorinated hydrocarbon and the like, as desired, in general, at elevated temperature up to 175° C., preferably from about 90° C. to about 130° C. The reaction readily proceeds and generally complete reaction of the itaconic acid or its ester with the available functional primary amine groups and cyclization to form a pyrrolidone group together with the Michler addition of the secondary amino group to the itaconic acid to form aminomethyl succinic acid or ester derivative will occur in from about 1 to 5 hours. Routine analytical techniques for amine and acid values as well as monitoring viscosity, color and water and/or alcohol evolution can be used to determine completion of the reaction.

Suitable capped or uncapped functional diamine silicone fluids for use in accordance with the practice of the invention, having one or more functional diamine group(s) that contain a primary amine group, and which may be linked terminally, laterally or both terminally and laterally as desired via an alkylene linkage to silicon are well known and are available commercially, for example from Dow Corning, General Electric and Shin-Etsu. Exemplary suitable functional diamine silicone fluids are silicone fluids having one or more aminoalkylaminoalkylene capped functional groups include, for example, aminoethylaminopropyl functional silicone fluids such as KF 393 from Shin-Etsu and aminoethylaminoisobutyl functional silicone fluids such as X2-8107 and Q2-8220 from Dow Corning. Suitable uncapped silicone fluids include alkoxy or hydroxy terminated silicone fluids such as KF857 from Shin-Etsu, and other methoxy terminated aminoethylaminopropyl functional silicone fluids. While the equivalent weight of the silicone fluids or compositions which may be employed in the preparation of the pyrrolidone-containing carboxyl and substituted aminomethyl succinic acid funcational polysiloxanes of the present invention is not critical, and suitable compositions may have equivalent weights of 12,000 or even higher, although silicone fluids having equivalent weights from about 500 to about 12,000 are in general preferred.

As indicated, the pyrrolidone-containing carboxyl functional polysiloxane compositions including the amphoteric class of polysiloxanes of the present invention are readily prepared by reaction of diamino functional silicone fluids wherein each of the diamine groups must contain a primary amine with itaconic acid or its ester. Itaconic acid (methylene succinic acid) is a compound of the formula:

$$CH_2=C(COOR_9)CH_2COOR_9$$

wherein
R$_9$, which can be the same or different, is hydrogen or lower alkyl (1–6 carbon atoms).

The compound itaconic acid is available commercially from Rhone Poulenc and Pfizer Chemicals Division whereas ester derivatives thereof are available from Morflex Inc., Greensboro, N.C. The compounds are produced by known fermentation techniques although chemical synthesis methods are also known.

The novel pyrrolidone-containing carboxyl functional polysiloxane compositions including the amphoteric class of polysiloxanes display many of the well known properties of silicone such as emolliency, detackification, smoothing, lubrication and sufactancy properties while, in addition, making them suitable as precursor reactors for the preparation of a variety of silicone-containing derivatives. In this connection, the novel compositions of the invention are suitable for the preparation of silicone-containing compositions which exhibit the unique property of water-dispersibility or solubility and substantivity.

It is therefore a further aspect of the invention to use the novel compositions of the invention, for example, in cosmetic and the like personal care preparations, especially in preparations for skin treatment and hair care. In this connection, personal care formulations can be hair conditioners and skin-treatment cremes and lotions. Other formulations where the unique properties of the novel compositions of the invention can be utilized include make-up cremes, sunscreens, lipstick, pressed powders, skin-toners, deodorants, antiperspirants and the like. Personal care preparations to which the novel compositions of the inventions have been added in amounts of 0.1% to 10% weight percent, and can contain other additives, provide skin treating products with non-irritating, non-greasy film on the skin that does not evaporate and therefore provides long lasting protection. In addition, these novel compositions demonstrate useful hair "dressing" characteristics.

Among other advantages of the novel carboxyl functional polysiloxanes of the invention are their usefulness as paper and textile sizing and lubricating agents; treating agents for fillers, paper and plastics; anticorrosion agents for metal products, and the like.

The preparation of specific compositions of the invention is illustrated by the following specific examples which are provided herein for purposes of illustration only and are not intended to limit the scope therein.

EXAMPLE 1

An aminoethyl aminopropyl trimethyl silyl capped silicone fluid having an amine equivalent weight of about 760 obtained commercially under the designation KF 393 from Shin-Etsu is used in this example.

228 grams of the above polysiloxane fluid (0.3 Equivalents) is admixed with 39 grams (0.3 moles) of Itaconic Acid in a reaction vessel. External heat is slowly applied to the reaction vessel bringing the reaction mixture to a temperature of about 120° C., whereupon an exotherm occurs raising the temperature to 130° C. The reaction mixture is stirred at about 125° C. for 3 additional hours. With the Itaconic acid being uniformly dispersed in the reaction mixture. A clear yellow viscous oil is prepared which does not flow at room temperature. The reaction product flows when heated and is readily soluble in ethanol.

The acid value of the reaction product is 57.5 (theoretical 64.3) while the alkali number is 64.3, (theoretical 64.3) confirming that there is the presence of carboxyl groups and amine groups on the product.

EXAMPLE 2

A Bis (Trimethylsiloxy capped) aminoethyl aminoisobutyl methylsiloxy co-dimethylsiloxy containing fluid obtained from Dow Corning Corp. under the trade designation X2-8107 is used in this example. The silicone fluid has an amine content of 0.25 percent which corresponds to an equivalent weight of 12,800.

A mixture of 128 grams of the silicone fluid and 1.3 grams of Itaconic acid is formed in a reaction vessel and heated to 125° C. The reaction mixture becomes very viscous and yellow in color with small amounts of water being evolved.

The mixture is heated for 3 hours at 125° C. with agitation and a viscous fluid is prepared. The reaction mixture is flowable at room temperature although very viscous. The reaction mixture has an acid number of 3.4 and alkali number of 4.7 (theoretical for both is 4.3).

EXAMPLE 3

A pendant (lateral) amino functional silicone fluid having an average equivalent weight of 4080 obtained from Dow Corning under the product designation Q2-8220 is used in this example.

81.6 grams (0.02 moles) of the silicone fluid is admixed with 2.6 grams of Itaconic acid (0.02 moles) in a reaction vessel and heated to a temperature of 125°–130° C. whereupon a viscous yellow oil is obtained and heating is continued for an additional four hours.

After cooling, the reaction product is a viscous non-flowable product. The reaction product is soluble in isopropanol.

EXAMPLE 4

Skin care creme compositions are prepared having the following proportion of ingredients. The pyrrolidone-containing carboxyl funcational polysiloxanes compositions of example 2 and example 3 are used in this example.

| PART | RAW MATERIAL | SAMPLE A % BY WT. | SAMPLE B % BY WT. |
|---|---|---|---|
| A | Cetyl Phosphate (Monafax 160) | 0.5 | 0.5 |
| A | Potassium Hydroxide (45% in H$_2$O) | 0.2 | 0.2 |
| A | Deionized Water | 76.25 | 77.11 |
| B | Glycerine | 10.0 | 10.0 |
| B | Propylene Glycol Stearate | 5.0 | 4.0 |
| B | Cetyl Alcohol | 2.0 | 2.0 |

| PART | RAW MATERIAL | SAMPLE A % BY WT. | SAMPLE B % BY WT. |
|---|---|---|---|
| B | Glyceryl Monostearate | 3.0 | 3.0 |
| B | Example 3 Amphoteric Silicone (50% in Ethanol) | 3.0 | — |
| B | Lactic Acid | 0.05 | 0.19 |
| B | Example 2 Amphoteric Silicone (50% in Isopropyl Palmitate) | — | 3.0 |

Heat Parts A and B individually to 75° C. with stirring. Add Part B slowly to Part A with stirring. Cool with mixing to 30° C.

Both formulations yield smooth glossy cremes which spread easily, break quickly and impart a smooth non-greasy emolliency to the skin. The smooth afterfeel on the skin persists even after exposure to water suggesting utilization of these silicone compositions in water-resistant skin-protection cremes, suntan products and make-up.

EXAMPLE 5

The pyrrolidone-containing carboxyl functional silicone composition of example 1 is used in this example. Hair conditioning spray/dip and hair shampoo formulations are prepared having the following proportion of ingredients.

Evalutation in a Hair Conditioning Spray/Dip

| Raw Material | Test Sample % by Weight |
|---|---|
| Amphoteric Silicone (Example 1) (25% in isopropanol) | 4.0 |
| Ethanol | 95.8 |
| Lactic Acid (88% in H$_2$O) | 0.2 |
| | 100.0 |

The addition of lactic acid makes the initially cloudy dispersion clear (pH=5.0@10% in H$_2$O). This formula yields a fine mist when used in a hand-pumped aerosol dispenser.

A hair swatch dipped in the test sample and dried, exhibits curl retention, good wet-and-dry combing properties, a silkier texture and better residual gloss versus a water-treated swatch indicating the suitability of the silicone composition as an additive in hair grooming/conditioning products.

Amphoteric Silicone Compatible in Shampoo Base

| Raw Material | Test Sample % by Weight |
|---|---|
| Ammonium Lauryl Sulfate (28% active) | 46.4 |
| Ammonium Lauryl Ether Sulfate (26% active) | 27.0 |
| Coconut Monoethanolamide | 3.0 |
| Ammonium Xylene Sulfonate (40% active) | 5.0 |

Amphoteric Silicone Compatible in Shampoo Base

| Raw Material | Test Sample % by Weight |
|---|---|
| Example 1 Silicone (25% in isopropanol) | 10.0 |
| Lactic Acid (88% in water) | 1.0 |
| Water | 7.6 |
| | 100.0 |

The resulting shampoo with 2.5% active amphoteric silicone of example 1 is clear and a hair tress washed in this shampoo and then rinsed with water exhibited acceptable wet combing properties.

EXAMPLE 7

A pendant amino functional silicone fluid having an average equivalent weight of 3965 obtained from Dow Corning under the product designation of Q2-8220 is used in this example.

There is combined under nitrogen with vigorous stirring, 79.3 grams (0.02 equivalence) and 5.2 grams of itaconic acid (0.4 moles) in a reaction vessel. The acid dispersed in the fluid is heated to about 120° C. whereupon the acid slowly dissolves. Upon reacting with the silicone fluid the viscosity increases significantly and bubbles appear to foam throughout the mixture. After 2 hours, both an alkali number of 12.2 and acid number of 37 is measured in a sample of the mixture. The reaction product is a pyrrolidone carboxylic acid containing tertiary amineehtyl succinic acid.

EXAMPLE 8

An alpha-omega functional silicone sluid comtaining aminoethyl aminopropyl methyl siloxy groups obtained as KF 857 fluid from Shin-Etsu is used in this example. The silicone fluid has an equivalent weight of 1690.

33.74 grams of the silicone fluid is combined with 5.2 grams of itaconic acid under a nitrogen atmosphere with good agitation in a reaction vessel. The mixture is heated to 130° C. for 2 hours whereupon all the itaconic acid is reacted with the amine groups to produce a single phase reaction mixture what is a clear viscous fluid. The reaction product has an alkali number of 30 and acid number of 8.4

Although some preferred embodiments have been described, many modifications and variations may be made thereto in light of the above teachings. It is therefore to be understood that within the scope of the appended claims, the invention may be practiced otherwise than as specifically described and illustrated.

What is claimed is:

1. A polysiloxane composition having the formula

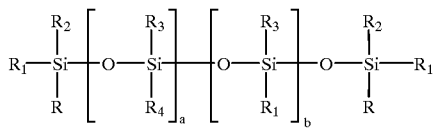

wherein:
R is selected from R$_2$ or —OR$_9$ wherein R$_9$ is hydrogen or alkyl;
R$_1$, which can be the same or different, is selected from R$_2$, a diamine containing group of the formula —F$_1$—NR$_9$—F—NH$_2$ and a pyrrolidone-containing functional carboxyl group of the general formula:

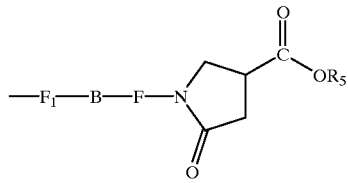

wherein at least one R$_1$ is a pyrrolidone containing functional carboxyl group or ester derivative thereof as shown;
R$_2$ is as defined below;
R$_5$ is hydrogen lower alkyl (C$_{1-6}$) or alkali metal;
F$_1$ is linear or branched alkylene of 1–12 carbon atoms;
F is linear or branched alkylene of 1–10 carbon atoms;
B is —NR$_7$, wherein R$_7$ is hydrogen or a dicarboxylic group of the formula —CH$_2$—CH(COOR$_9$)—CH$_2$COOR$_2$ wherein R$_9$ is hydrogen or an alkyl, with the proviso that at least 25% of R$_7$ is a dicarboxylic group;
R$_2$ can be the same or different and is selected from alkyl, aryl or olefinic;
R$_3$ and R$_4$, which may be the same or different are selected from alkyl, aryl, capped or uncapped polyoxyalkylene, alkaryl, aralkylene or alkenyl;
a is an integer from 0 to 50,000; and
b is an integer from 0 to 100.

2. The polysiloxane composition as claimed in claim 1, wherein R$_5$ is hydrogen or lower alkyl (C$_{1-6}$).

3. The polysiloxane composition as claimed in claim 1, wherein R$_1$ is R$_2$ or the pyrrolidone-containing carboxyl functional group or ester derivative thereof and wherein R$_7$ is the dicarboxylic containing group and at least one of R$_1$ is the pyrrolidone-containing carboxyl functional group or ester derivative thereof wherein R$_7$ is the dicarboxylic containing group.

4. The polysiloxane composition as claimed in claim 1, wherein at least one terminally linked R$_1$ group is the pyrrolidone containing carboxyl functional group or ester derivative thereof.

5. The polysiloxane composition as claimed in claim 1, wherein R$_3$ and R$_4$ are methyl and a is at least 1.

6. The polysiloxane composition as claimed in claim 1, wherein both terminal R and R$_1$ groups are R$_2$ and a and b are each at least 1.

7. The polysiloxane composition as claimed in claim 1, wherein the terminal R$_1$ groups are R$_2$ and the R groups are —OR$_9$.

8. The polysiloxane composition as claimed in claim 1, wherein R$_2$, R$_3$ and R$_4$ are methyl.

9. The polysiloxane composition as claimed in claim 1, wherein R is —OR$_9$ and R$_9$ is hydrogen.

10. The polysiloxane composition as claimed in claim 1, wherein a and b are zero.

11. The polysiloxane composition as claimed in claim 1, wherein b is zero.

12. The polysiloxane composition as claimed in claim 1, wherein at least 75% of R$_7$ is a carboxylic group.

13. A personal care and cosmetic composition comprising at least 0.1% of a polysiloxane composition as claimed in claim 1.

14. A method for preparing polysiloxane compositions containing at least one pyrrolidone-containing carboxyl functional group or the ester derivatives thereof, which comprises reacting an organosilicone composition having at least one diamine functional group containing a primary and secondary amine group with itaconic acid or an ester derivative thereof at an elevated temperature for a time sufficient to react substantially all the itaconic acid or ester derivative thereof with the primary and secondary amine group(s) on the silicone composition and to form an organosilicone composition having at least one pyrrolidone containing carboxyl functional group.

15. The method for preparing polysiloxane compositions as claimed in claim 14, wherein said organosilicone composition having at least one diamine functional group containing a primary amine and secondary amine group is substantially compatible with said itaconic acid or ester derivative thereof at the reaction temperature and forms a homogeneous reaction mixture therewith.

16. The method for preparing polysiloxane compositions as claimed in claim 14, wherein reaction of said organosilicone composition having at least one diamine functional group and itaconic acid or ester is carried out at a temperature from about 90° C. to about 130° C.

17. The method for preparing polysiloxane compositions as claimed in claim 14, wherein about a stoichiometric amount of itaconic acid or its ester derivative per functional diamine group(s) containing a primary and secondary amine group is employed in said reaction.

18. The method for preparing polysiloxane compositions as claimed in claim 14, wherein said organosilicone composition has one or more terminal or lateral diamine functional groups.

* * * * *